US008221069B2

(12) United States Patent
Ogino et al.

(10) Patent No.: US 8,221,069 B2
(45) Date of Patent: Jul. 17, 2012

(54) MULTI-BLADE FAN

(75) Inventors: Kazuo Ogino, Aichi (JP); Seiji Shirahama, Aichi (JP)

(73) Assignee: Panasonic Corporation, Osaka (JP)

(*) Notice: Subject to any disclaimer, the term of this patent is extended or adjusted under 35 U.S.C. 154(b) by 973 days.

(21) Appl. No.: 12/096,656

(22) PCT Filed: Mar. 12, 2007

(86) PCT No.: PCT/JP2007/054767

§ 371 (c)(1), (2), (4) Date: Jun. 9, 2008

(87) PCT Pub. No.: WO2007/108342

PCT Pub. Date: Sep. 27, 2007

(65) Prior Publication Data

US 2009/0162198 A1 Jun. 25, 2009

(30) Foreign Application Priority Data

Mar. 17, 2006 (JP) ................................ 2006-073810
Jul. 4, 2006 (JP) ................................ 2006-184046

(51) Int. Cl.

| | |
|---|---|
| ***F04D 29/44*** | (2006.01) |
| ***F04D 29/54*** | (2006.01) |
| ***B63H 5/02*** | (2006.01) |
| ***B63H 1/26*** | (2006.01) |
| ***B63H 1/16*** | (2006.01) |
| ***B64C 11/00*** | (2006.01) |
| ***F01D 5/14*** | (2006.01) |

(52) U.S. Cl. ........ 415/206; 416/175; 416/178; 416/182; 416/223 B

(58) Field of Classification Search .................. 416/175, 416/178, 182, 185, 186 R, 187, 198 R, 223 B; 415/206
See application file for complete search history.

(56) References Cited

U.S. PATENT DOCUMENTS

| | | | | |
|---|---|---|---|---|
| 4,427,339 | A * | 1/1984 | Witzel | .......................... 416/131 |
| 2002/0023728 | A1 * | 2/2002 | Kikuchi et al. | ............... 164/113 |

FOREIGN PATENT DOCUMENTS

| | | | |
|---|---|---|---|
| JP | S59170698 | U | 11/1984 |
| JP | 62271995 | A | 11/1987 |
| JP | S6375593 | U | 5/1988 |

(Continued)

OTHER PUBLICATIONS

Omori et al. (JP 2001-271791) Foreign reference; Omori et al. (JP 2001-271791) abstract translation; Omori et al. (JP 2001-271791) translation.*

(Continued)

*Primary Examiner* — Edward Look
*Assistant Examiner* — Su Htay
(74) *Attorney, Agent, or Firm* — RatnerPrestia

(57) ABSTRACT

A multi-blade fan including a spirally-shaped casing having an inlet and an outlet; an electric motor disposed inside the casing; a main plate provided perpendicular to a rotation axis of the electric motor and having a ventilation hole; first blades disposed at a side of the inlet of the main plate; and second blades disposed at an opposite side of the inlet of the main plate. Herein, a diameter of the main plate is smaller than an outer diameter of the first and second blades and is larger than an inner diameter of them. Furthermore, an outlet angle of any one or both of the first blade and the second blade is sequentially changed in an axis direction.

8 Claims, 9 Drawing Sheets

FOREIGN PATENT DOCUMENTS

| | | | | |
|---|---|---|---|---|
| JP | 6-2698 | A | | 1/1994 |
| JP | 11093893 | A | * | 4/1999 |
| JP | 2001-115997 | A | | 4/2001 |
| JP | 2001115997 | | * | 4/2001 |
| JP | 2001-271791 | A | | 10/2001 |
| JP | 2001271791 | A | * | 10/2001 |
| JP | 2002357196 | A | * | 12/2002 |
| JP | 2005036732 | A | * | 2/2005 |
| JP | 2005337052 | A | | 12/2005 |

OTHER PUBLICATIONS

Kai et al. (JP 2001-115997) Foreign reference; Kai et al. (JP 2001-115997) Abstract Translation; Kai et al. (JP 2001-115997) translation.*

Ogino et al. (JP 2002-357196) Foreign reference; Ogino et al. (JP 2002-357196) Abstract Translation; Ogino et al. (JP 2002-357196) translation.*

Matsunaga et al. (JP 11-093893) Foreign reference;Matsunaga et al. (JP 11-093893) Abstract Translation; Matsunaga et al. (JP 11-093893) translation.*

Omori et al. (JP 2005-036732) Foreign reference; Omori et al. (JP 2005-036732) Abstract Translation; Omori et al. (JP 2005-036732) translation.*

International Search Report for PCT/JP2007/054767, dated Apr. 10, 2007.

* cited by examiner

MULTI-BLADE FAN

This application is a U.S. National Phase Application of PCT International Application PCT/JP2007/054767.

TECHNICAL FIELD

The present invention relates to a multi-blade fan installed mainly at a ceiling and to be used as a ventilation blower.

BACKGROUND ART

As conventional multi-blade fans of this kind, one including an orifice having a bellmouth-shaped inlet is known and disclosed in, for example, patent document 1. Hereinafter, the multi-blade fan is described with reference to FIGS. 16 and 17.

As shown in the drawings, multi-blade fan 101 includes main plate 102 having opening 103. Upper blade 105 at the side of lateral plate 104 of main plate 102 and lower blade 106 on the opposite side of lateral plate 104 of main plate 102 have different sectional shapes from each other.

In the above-mentioned configuration, when multi-blade fan 101 is rotated, sucked air passes through sucking hole 108 of orifice 107, and is subjected to increasing pressure by lower blades 106 at a low pressure of high air volume and is subjected to increasing pressure by upper blades 105 at a high pressure of low air volume. At this time, one or both of an inlet angle and an outlet angle are different between lower blade 106 and upper blade 105. Thus, a high-performance multi-blade fan can be obtained.

When such a conventional multi-blade fan controls an air volume to be constant by using a property of a fan, it generally detects the number of rotation, a voltage and an electric current depending upon the number of rotation, and the like, at a low pressure of high air volume and at a high pressure of low air volume. However, it is not suitable for controlling of an air volume to be constant because the difference between the number of rotation at a low pressure of high air volume and the number of rotation at a high pressure of low air volume is not large. Furthermore, the fan efficiency is not good. Increase in the difference in the number of rotation and improvement of the fan efficiency have been demanded.

[Patent Document 1] Japanese Patent No. 3507758

SUMMARY OF THE INVENTION

A multi-blade fan of the present invention includes a spirally-shaped casing having a bellmouth-shaped inlet and an outlet at one side; an electric motor disposed inside this casing; a main plate provided perpendicular to a rotation axis of the electric motor and having a ventilation hole; first blades disposed at the side of the inlet of the main plate; and second blades disposed at the opposite side of the inlet of the main plate. Herein, the diameter of the main plate is smaller than the outer diameter of the first blades and the outer diameter of the second blades and is larger than the inner diameter of the first blades and the inner diameter of the second blades. Furthermore, an outlet angle of any one or both of the first blade and the second blade is sequentially changed in the axis direction.

With this configuration, the present invention can provide a multi-blade fan in which the difference between the number of rotation at a low pressure of high air volume and the number of rotation at a high pressure of low air volume is increased and which facilitates controlling an air volume to be constant.

REFERENCE MARKS IN THE DRAWINGS

Figure 1:
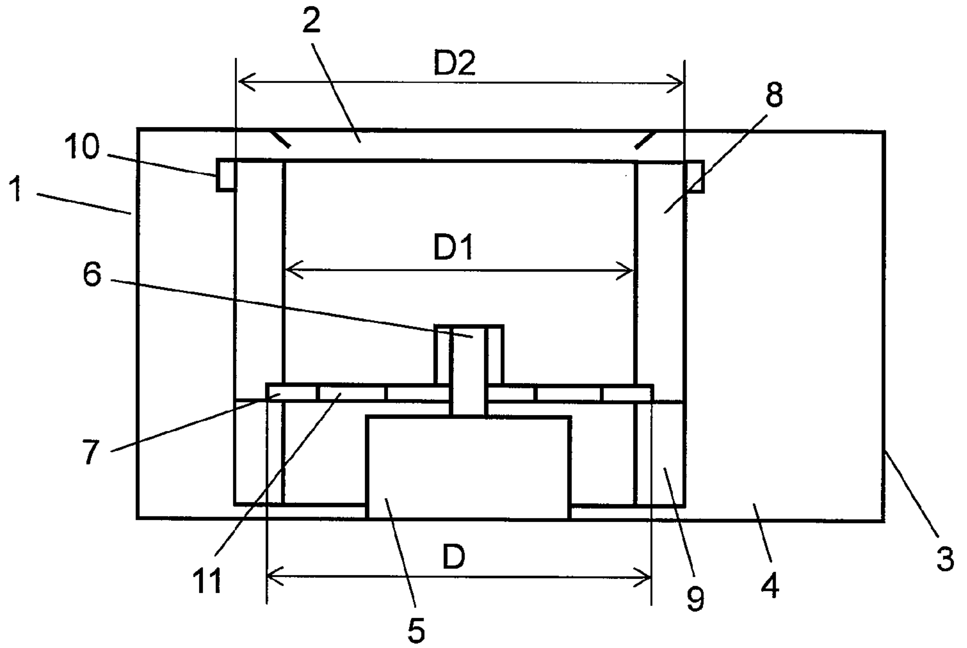
FIG. 1 is a schematic view showing a side surface of a multi-blade fan in accordance with a first exemplary embodiment of the present invention.

1 multi-blade fan
2 inlet
3 outlet
4 casing
5 electric motor
6 rotation axis
7 main plate
8 first blade
**8*a*** first blade at high speed
9 second blade
**9*a*** second blade at high speed
10 lateral plate
11 ventilation hole β1 inlet angle of first blade
β2 outlet angle of first blade at the side of inlet
β0 average outlet angle of first blade
β0*a* average outlet angle of first blade at high speed
β3 inlet angle of second blade
β4 outlet angle of second blade
β4*a* outlet angle of second blade at high speed
β6 outlet angle of first blade at main plate
D diameter of main plate
D1 inner diameter of first and second blades
D2 outer diameter of first and second blades
D3 inner diameter of second blade
D8 inner diameter of first blade
R rotation direction

DETAILED DESCRIPTION OF THE PREFERRED EMBODIMENTS

Hereinafter, exemplary embodiments of the present invention are described with reference to the drawings.

First Exemplary Embodiment

Figure 2:
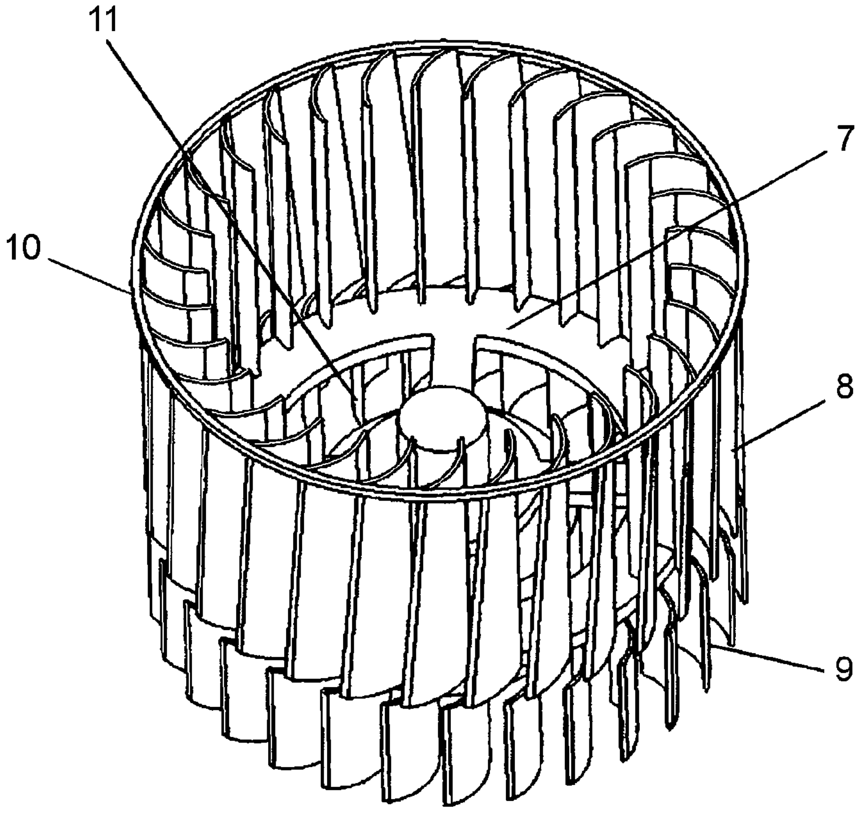
FIG. 2 is a perspective view showing the multi-blade fan in accordance with the first exemplary embodiment of the present invention.
Figure 3:
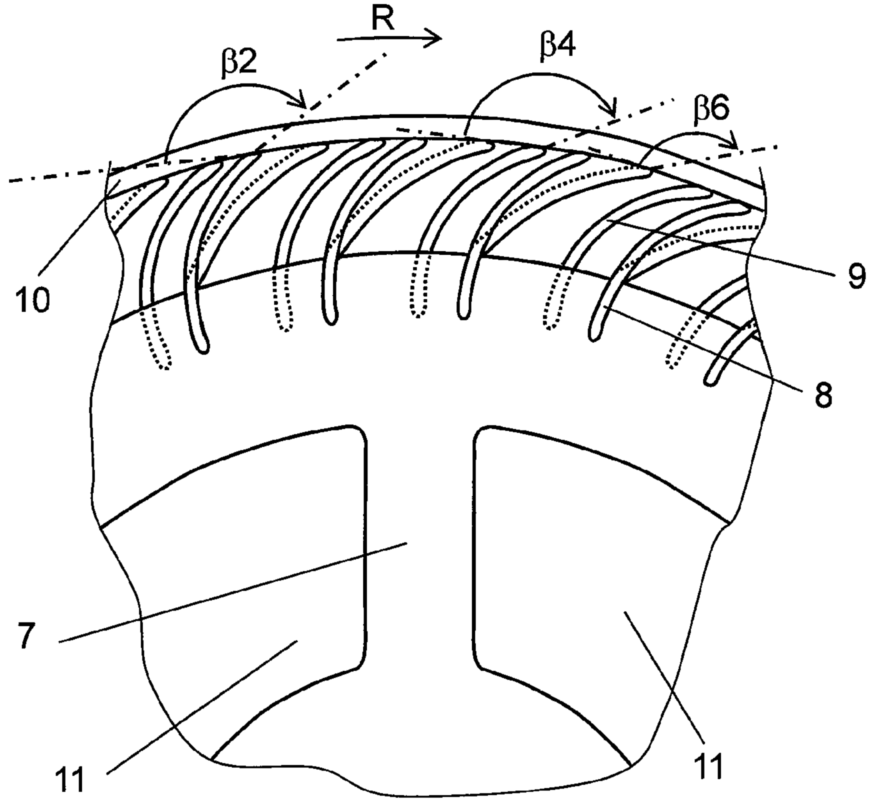
FIG. 3 is a detailed view showing a blade of the multi-blade fan in accordance with the first exemplary embodiment of the present invention.
Figure 4:
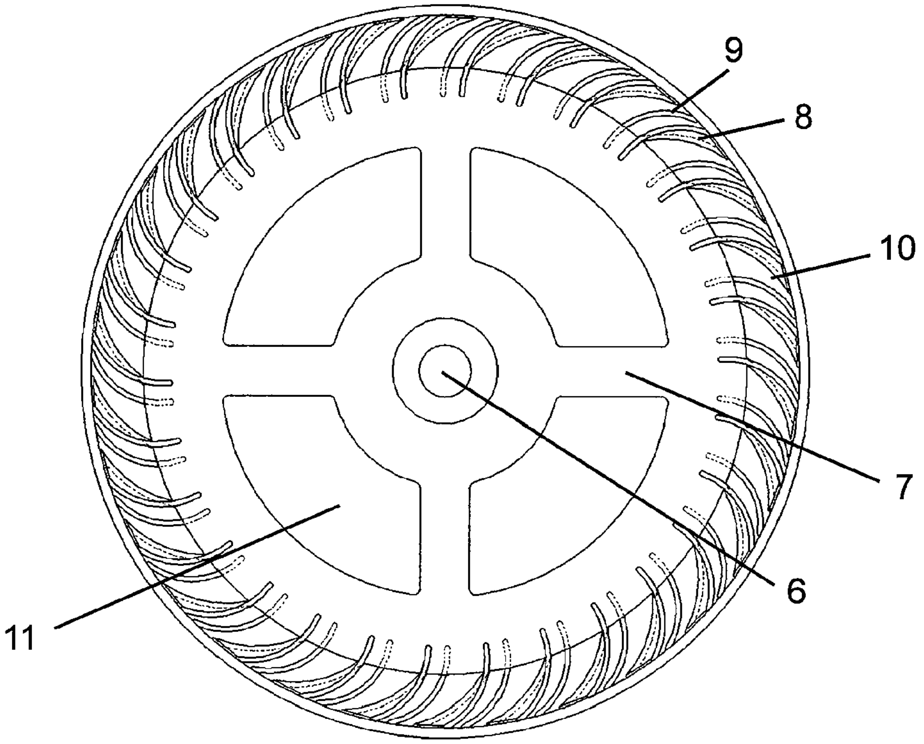
FIG. 4 is a front view showing the multi-blade fan in accordance with the first exemplary embodiment of the present invention.

FIG. 1 is a schematic view showing a side surface of a multi-blade fan in accordance with a first exemplary embodiment of the present invention. FIG. 2 is a perspective view thereof FIG. 3 is a detailed view of a blade thereof. FIG. 4 is a front view thereof.

As shown in FIGS. 1 to 4, multi-blade fan 1 includes spirally-shaped casing 4. Casing 4 has bellmouth-shaped inlet 2 and outlet 3 at one side. Multi-blade fan 1 further includes electric motor 5 as a driving device inside casing 4; main plate 7 perpendicular to rotation axis 6 of electric motor 5; a plurality of inlet side blades (referred to as "first blades") 8 disposed at the side of inlet 2 of main plate 7; and a plurality of blades (referred to as "second blades") 9 disposed at the opposite side to the side of inlet 2. Ring-shaped lateral plate 10 is disposed at the side of inlet 2 on the outer periphery of first blades 8. Furthermore, main plate 7 has sector-shaped ventilation holes 11 for allowing airflow to pass from the side of first blades 8 to the side of second blades 9. In this exemplary embodiment, the inner and outer diameters of first blades 8 are the same as those of second blades 9. Then, diameter D of main plate 7 is set to be smaller than outer diameter D2 of first blades 8 and second blades 9, and larger than inner diameter D1 thereof.

Note here that the above-mentioned ring-shaped lateral plate 10 is not limited to one disposed at the side of inlet 2 of first blades 8. It may be disposed at second blades 9 or may be disposed at both first blades 8 and second blades 9.

Herein, an outlet angle of each blade is defined as follows. The outlet angle is an angle made by an extension line of a center line of the blade and the downstream side of the outer periphery in the rotation direction, at an intersection between the outer periphery of the blade and the center line of the blade, on the sectional surface perpendicular to the rotation axis.

The outlet angle of first blade 8 is sequentially changed in the axis direction. The outlet angle is β2 at the side of inlet 2 and β6 at the side of main plate 7. Outlet angle β6 is set to be larger than outlet angle β2. Average outlet angle β0 as an average of outlet angle β2 at the side of inlet 2 and outlet angle β6 at the side of main plate 7 is in the range from 150° to 160°, which is an angle generally employed for a usual multi-blade fan whose outlet angle of the blade is constant in the axis direction.

Furthermore, outlet angle β4 of second blade 9 is not changed in the axis direction and is constant. Outlet angle β4 is set to be smaller than outlet angle β6 of first blade 8 at the side of main plate 7.

In the above-mentioned configuration, when first blades 8 and second blades 9 are rotated in the rotation direction R by electric motor 5, airflow is sucked in from inlet 2 and subjected to increasing pressure by first blades 8 and second blades 9. The sucked airflow flows to a part at the side of main plate 7 of first blades 8 at a low pressure of high air volume, and flows to a part in the vicinity of the suction side of first blades 8 at a high pressure of low air volume. The shape of ventilation hole 11 is not limited to a sector shape, and any shapes with an opening allow airflow to pass through ventilation hole 11 in accordance with the movement of the blades.

In general, when a fan is operated by using small electric motor 5 at the same voltage, at a low pressure, since a load applied from the fan is large, the number of rotation is reduced. At a high pressure, since a load applied from the fan is small, the number of rotation is increased as compared with the low pressure. By detecting this number of rotation, the state of pressure applied to the fan is determined. When it is determined to be at a low pressure, the voltage of electric motor 5 is reduced. When it is determined to be at a high pressure, the voltage of electric motor 5 is increased. Thus, regardless of whether the state of pressure is high or low, air volume is set to a desired air volume. In this way, since the state of pressure is subjected to sensing based on the number of rotation, the difference in the number of rotation between the low pressure time and the high pressure time is preferably as large as possible. Thereby, the air volume can be easily controlled to be constant. Note here that instead of detecting the number of rotation, a voltage or an electric current depending upon the number of rotation may be detected.

On the other hand, the airflow sucked into multi-blade fan 1 usually flows to the side of lateral plate 10 at a high pressure, and flows to the side of main plate 7 at a low pressure of high air volume. However, since the airflow does not easily pass through ventilation hole 11 of main plate 7, the largest volume of air flows to a part at the side of the inlet side of main plate 7.

Next, outlet angles β2 and β6 of first blade 8 and outlet angle β4 of second blade 9 are described. When airflow flows to the opposite side to the inlet at a low pressure, since outlet angle β6 of first blade 8 at the side of main plate 7 is larger than average outlet angle β0, a load is increased. Therefore, when a fan is rotated by electric motor 5 at the same voltage as that of a fan having a constant average outlet angle of β0, the number rotation is smaller than that rotated at average outlet angle of β0. Furthermore, when airflow flows to the side of lateral plate 10 at a high pressure, since outlet angle β2 of first blade 8 is smaller than average outlet angle β0, a load is reduced. Therefore, when a fan is rotated by electric motor 5 at the same voltage as that of a fan having a constant average outlet angle of β0, the number rotation is larger than that rotated at average outlet angle of β0.

At a low pressure time, when airflow flows to the opposite side to the inlet, the volume of airflow passing through ventilation hole 11 of main plate 7 and reaching second blade 9 is small. Accordingly, outlet angle β4 of the second blade is set to be smaller than outlet angle β6 of first blade 8. Thus, in a place in which the airflow volume is largest, the blade outlet angle is set to an angle with a large load, and in a place in which airflow volume is small, the blade outlet angle is set to an angle with a small load. Consequently, a multi-blade fan with high efficiency can be achieved. Herein, a driving voltage of electric motor 5 is a usual commercial voltage, for example, 100V or 200V.

As result, the difference in the number of rotation driven at the same voltage and by the same electric motor between a low pressure time and a high pressure time is increased, which facilitates controlling an air volume to be constant and makes it possible to achieve a multi-blade fan with high efficiency.

Note here that outlet angle β4 of second blade 9 is made to be constant. However, when it is changed sequentially in the axis direction similar to that of first blade 8, the difference in the number of rotation is further increased, which facilitates controlling an air volume to be constant and makes it possible to achieve a multi-blade fan with high efficiency.

Furthermore, when the output angle of first blade 8 is constant and outlet angle β4 of second blade 9 is sequentially changed in the axis direction, although the effect is reduced, the difference in the number of rotation is increased. Thus, controlling an air volume to be constant is facilitated and it is possible to achieve a multi-blade fan with high efficiency.

Second Exemplary Embodiment

Figure 5:
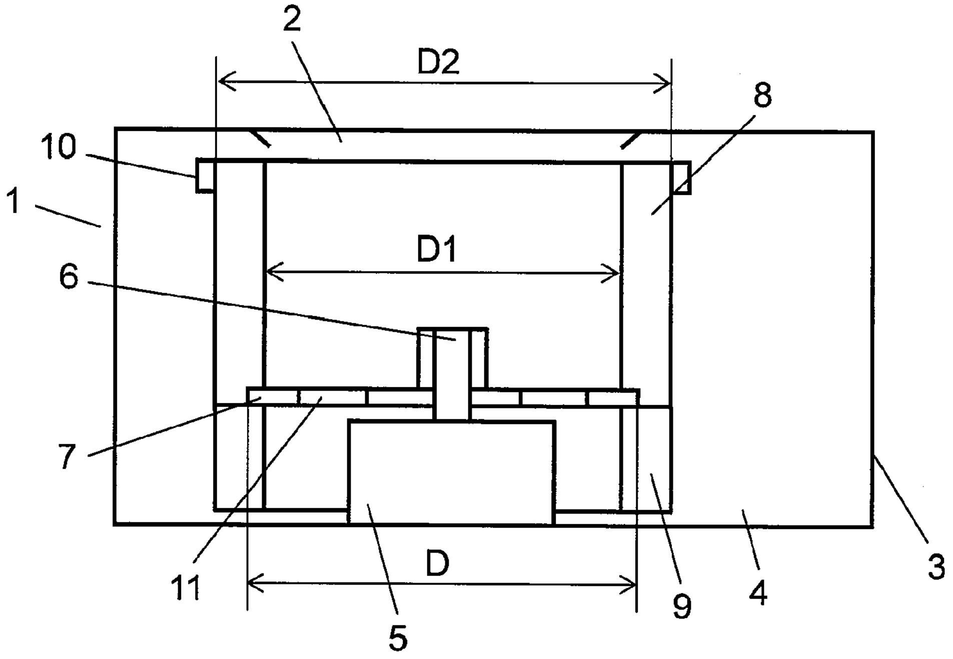
FIG. 5 is a schematic view showing a side surface of a multi-blade fan in accordance with a second exemplary embodiment of the present invention.
Figure 6:
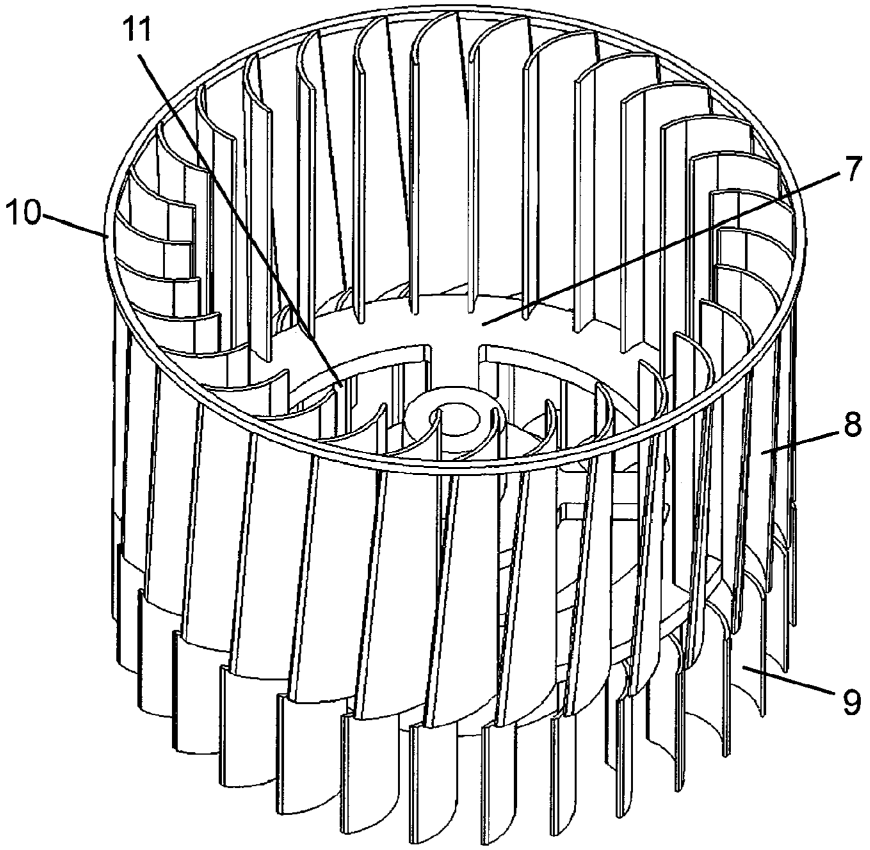
FIG. 6 is a perspective view showing the multi-blade fan in accordance with the second exemplary embodiment of the present invention.
Figure 7:
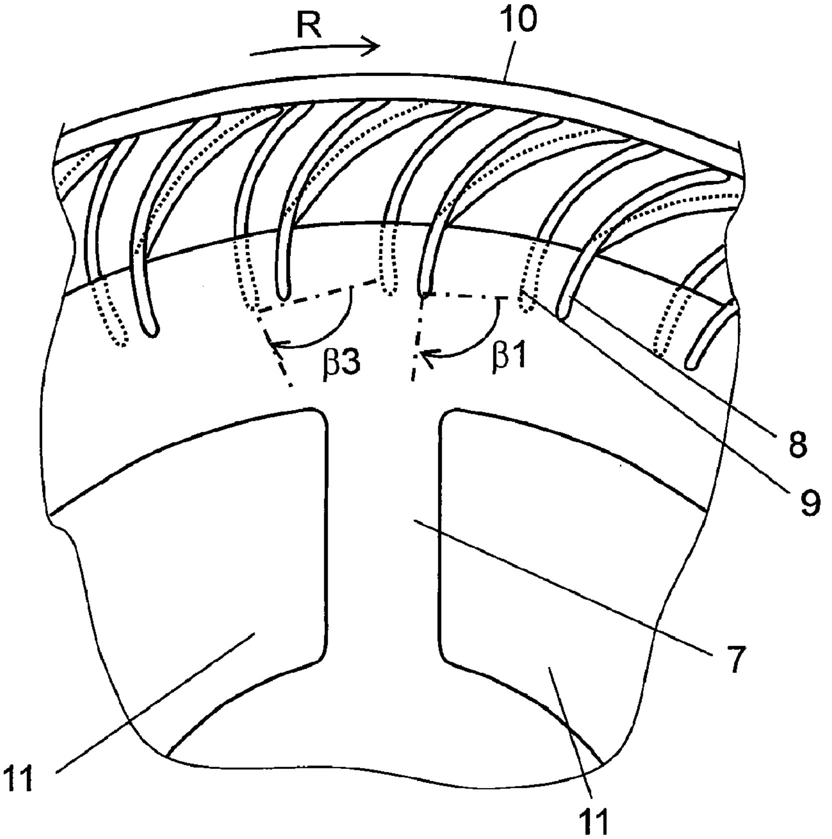
FIG. 7 is a detailed view showing a blade of the multi-blade fan in accordance with the second exemplary embodiment of the present invention.

FIG. 5 is a schematic view showing a side surface of a multi-blade fan in accordance with a second exemplary embodiment of the present invention. FIG. 6 is a perspective view thereof. FIG. 7 is a detailed view showing a blade thereof. The same reference numerals are given to the same components as in the first exemplary embodiment and the detailed description thereof is omitted.

Herein, an inlet angle of each blade is defined as follows. The inlet angle is an angle made by an extension line of a center line of the blade and the upstream side of the inner periphery in the rotation direction, at an intersection between the inner periphery of the blade and the center line of the blade on the sectional surface perpendicular to the rotation axis.

As shown in FIGS. 5 to 7, inlet angle β1 of first blade 8 disposed at the side of the inlet and inlet angle β3 of second blade 9 disposed on the opposite side to the side of the inlet are not changed in the axis direction and they are constant. Furthermore, inlet angle β3 of second blade 9 is set to be smaller than inlet angle β1 of the first blade. The other configurations are the same as those in the first exemplary embodiment.

In the above-mentioned configuration, when first blades 8 and second blades 9 are rotated in the rotation direction R by electric motor 5, airflow sucked in from inlet 2 enters multi-blade fan 1 and subjected to increasing pressure by first blades 8 and second blades 9. At a low pressure of high air volume, the sucked airflow flows to a part at the side of main plate 7 of first blades 8. At a high pressure of low air volume, the airflow flows to a part in the vicinity of the suction side of first blades 8. The shape of ventilation hole 11 is not limited to a sector shape, and any shapes with an opening allow airflow to pass through ventilation hole 11 in accordance with the movement of the blades. However, since airflow does not easily pass through ventilation hole 11 of main plate 7, the largest volume of air flows to the part at the side of the inlet of main plate 7.

Herein, inlet angle β1 of first blade 8 is set to be in the range from 70° to 90°. Furthermore, inlet angle β3 of second blade 9 is set to be in the range from 50° to 80°, that is, smaller than inlet angle β1. As mentioned above, since both inlet angle β1 and inlet angle β3 are not changed in the axis direction and are constant, they can be molded in the axis direction.

Airflow moving from ventilation hole 11 of main plate 7 to second blades 9 is small both at low pressure and high pressure. Accordingly, outlet angle β4 and inlet angle β3 of second blade 9 are smaller than outlet angle β6 and inlet angle β1 of first blade 8 at the side of main plate 7, respectively. Therefore, at the side of main plate 7 of first blade 8 in which the airflow volume is largest, blade inlet and outlet angles with a large load are set. In a part in the vicinity the suction side of first blades 8 or in the second blade in which airflow volume is small, a blade outlet angle with a small load is set. Furthermore, since the second blade has an inlet angle with a small load, a multi-blade fan with high efficiency can be achieved.

Herein, a voltage referred to as the same voltage is a usual commercial voltage, for example, 100V or 200V.

As result, the difference in the number of rotation at the same voltage and by the same electric motor between a low pressure time and a high pressure time is increased, which facilitates controlling an air volume to be constant and makes it possible to achieve a multi-blade fan with high efficiency.

Third Exemplary Embodiment

Figure 8:
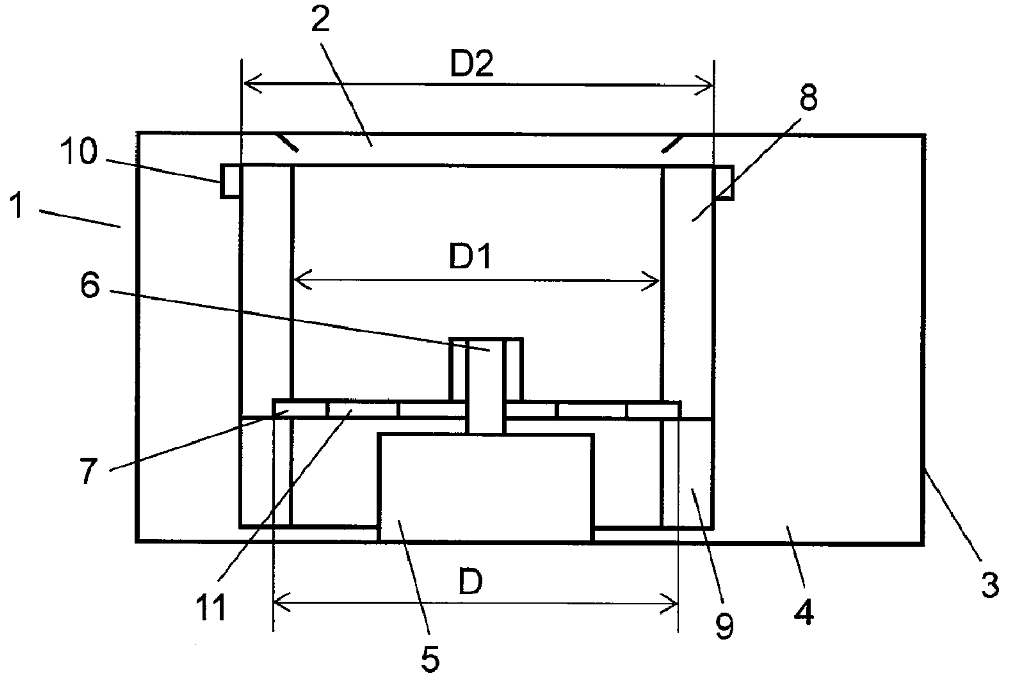
FIG. 8 is a schematic view showing a side surface of a multi-blade fan in accordance with a third exemplary embodiment of the present invention.
Figure 9:
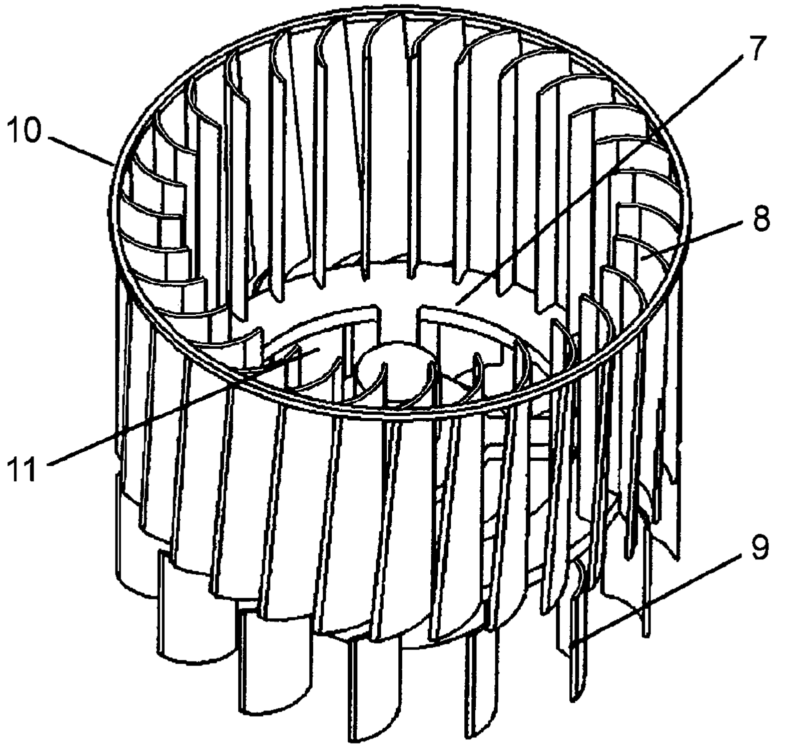
FIG. 9 is a perspective view showing the multi-blade fan in accordance with the third exemplary embodiment of the present invention.
Figure 10:
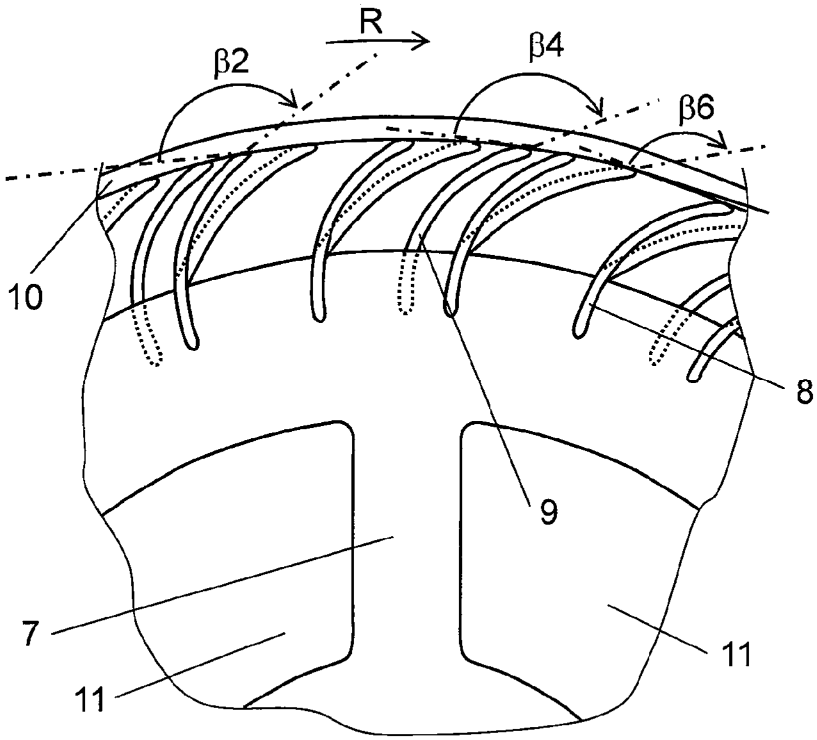
FIG. 10 is a detailed view showing a blade of the multi-blade fan in accordance with the third exemplary embodiment of the present invention.

FIG. 8 is a schematic view showing a side surface of a multi-blade fan in accordance with a third exemplary embodiment of the present invention. FIG. 9 is a perspective view thereof. FIG. 10 is a detailed view showing a blade thereof. The same reference numerals are given to the same components as in the first or second exemplary embodiment and the detailed description thereof is omitted.

As shown in FIGS. 8 to 10, the number of second blades 9 on the opposite side to the inlet is set to be smaller than the number of second blades 8 at the side of the inlet. The other configurations are the same as in the first exemplary embodiment.

In the above-mentioned configuration, when first blades 8 and second blades 9 are rotated in the rotation direction R by electric motor 5, airflow enters multi-blade fan 1 from inlet 2 and subjected to increasing pressure by first blades 8 and second blades 9. At a low pressure of high air volume, the sucked airflow flows to a part at the side of main plate 7 of first blades 8. At a high pressure of low air volume, the airflow flows to a part in the vicinity of the suction side of first blades 8. The shape of ventilation hole 11 is not limited to a sector shape, and any shapes with an opening allow airflow to pass through ventilation hole 11 in accordance with the movement of the blades.

On the other hand, the airflow sucked into multi-blade fan 1 usually flows to the side of lateral plate 10 at a high pressure, and flows to the side of main plate 7 at a low pressure of high air volume. However, since airflow does not easily pass through ventilation hole 11 of main plate 7, the largest volume of air flows to a part at the side of inlet of main plate 7.

Herein, the number of second blades 9 is set to 20 to 40, smaller than the general number, i.e., 40 to 60. Therefore, according to the amount of airflow, a load is reduced both at low pressure and at high pressure. Thus, fan efficiency is improved. The difference in the number of rotation by the same electric motor is increased both at a low pressure and a high pressure. The effect of facilitating controlling an air volume to be constant is the same because first blade 8 is twisted in the axis direction.

Fourth Exemplary Embodiment

Figure 11:
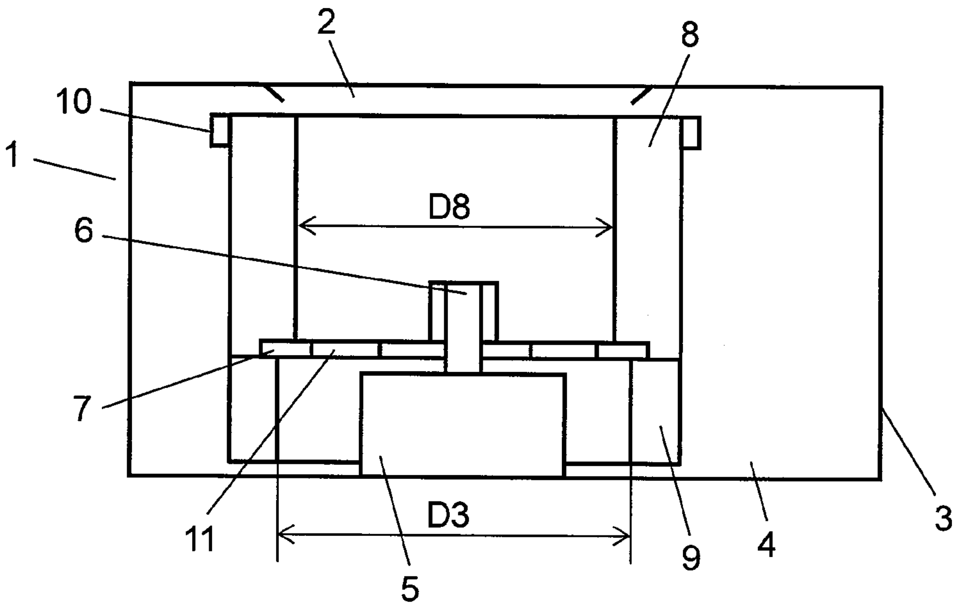
FIG. 11 is a schematic view showing a side surface of a multi-blade fan in accordance with a fourth exemplary embodiment of the present invention.
Figure 12:
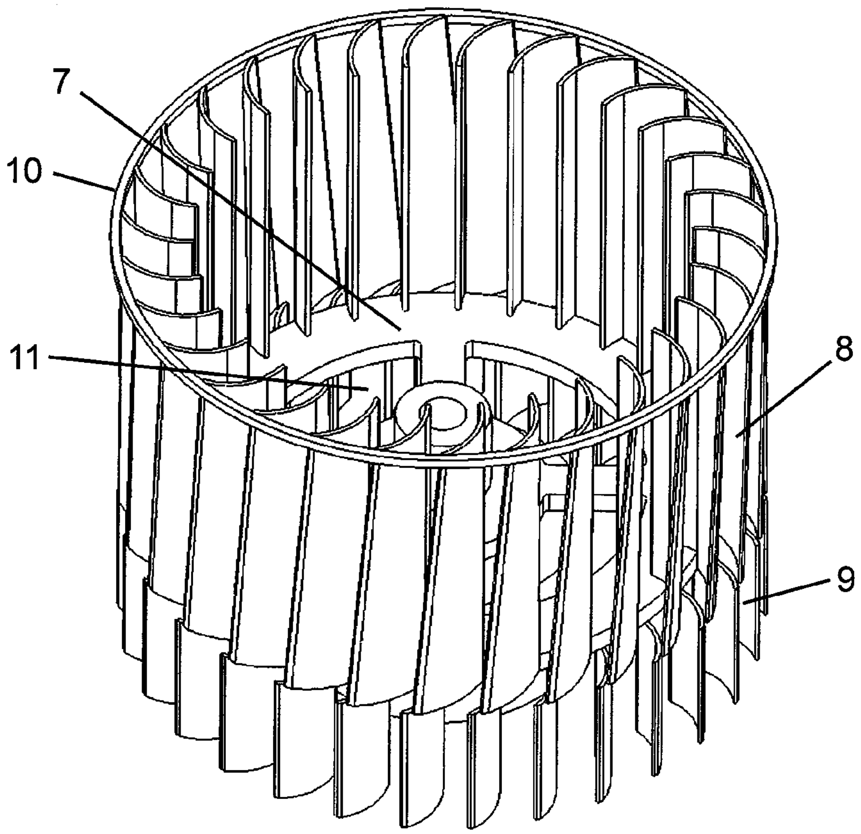
FIG. 12 is a perspective view showing the multi-blade fan in accordance with the fourth exemplary embodiment of the present invention.
Figure 13:
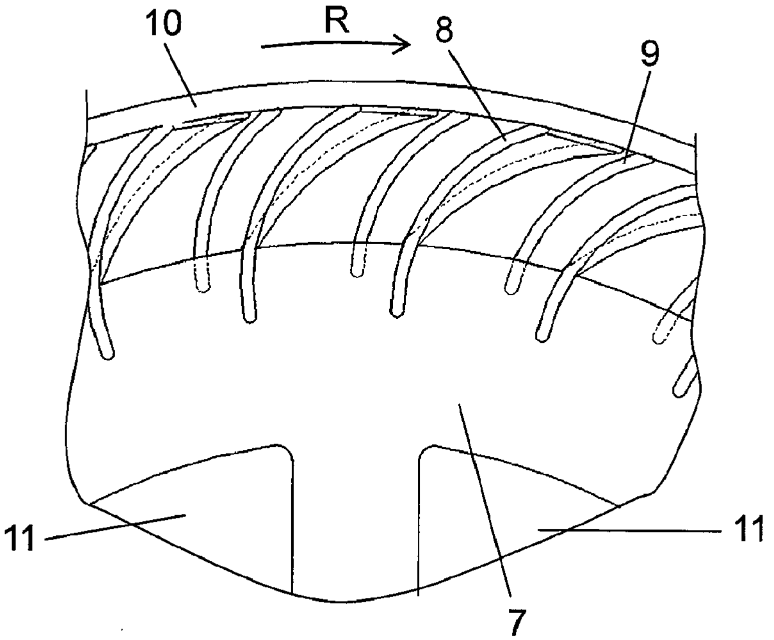
FIG. 13 is a detailed view showing a blade of the multi-blade fan in accordance with the fourth exemplary embodiment of the present invention.

FIG. 11 is a schematic view showing a side surface of a multi-blade fan in accordance with a fourth exemplary embodiment of the present invention. FIG. 12 is a perspective view thereof. FIG. 13 is a detailed view showing a blade thereof. The same reference numerals are given to the same components as in the first to third exemplary embodiments and the detailed description thereof is omitted.

As shown in FIGS. 11 to 13, in first blade 8 and second blade 9, the blade inner diameter is made to be different between the upper part and the lower part in the axis direction of main plate 7. That is to say, inner diameter D3 of second blades 9 is set to be larger than inner diameter D8 of first blades 8. The other configurations are the same as those in the first exemplary embodiment.

In the above-mentioned configuration, when first blades 8 and second blades 9 are rotated in the rotation direction R by electric motor 5, airflow sucked in from inlet 2 enters multi-blade fan 1 and subjected to increasing pressure by first blades 8 and second blades 9. At a low pressure of high air volume, the sucked airflow flows to second blades 9 located lower than the suction side. At a high pressure of low air volume, the airflow flows to first blades 8 in the vicinity of the suction side.

However, since electric motor 5 is disposed in the middle part of second blades 9, the airflow from inlet 2 does not easily flow to second blades 9. However, since inner diameter D3 of second blades 9 is larger than a usual general inner diameter having the ratio of the inner diameter to the outer diameter of 0.85, the airflow enters second blades 9 smoothly.

As a result, in particular, at a low pressure of high air volume time when the airflow tends to flow to the lower part, second blades 9 also work effectively. Thus, a multi-blade fan with high efficiency can be achieved.

Fifth Exemplary Embodiment

Figure 14:
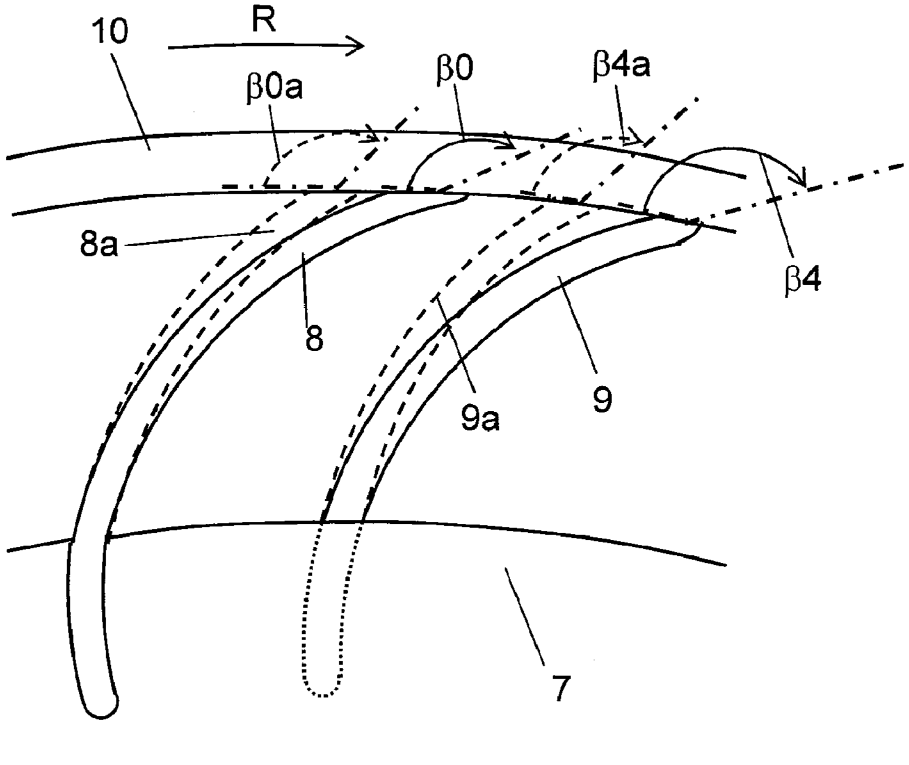
FIG. 14 is a detailed view showing a blade of the multi-blade fan in accordance with a fifth exemplary embodiment of the present invention.
Figure 15:
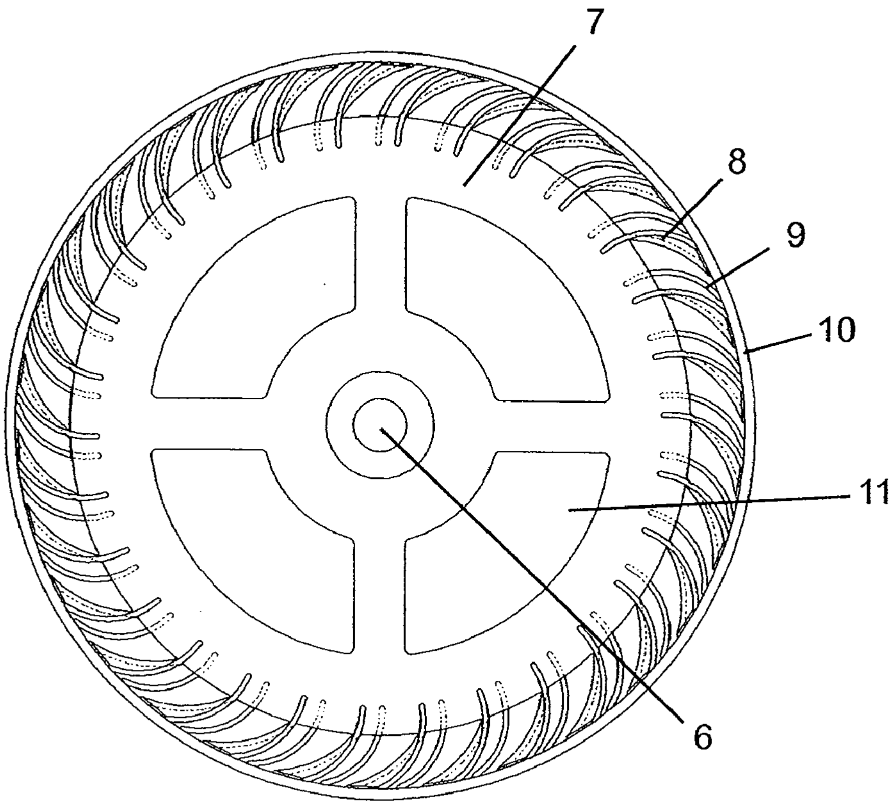
FIG. 15 is a front view showing the multi-blade fan in accordance with the fifth exemplary embodiment of the present invention.
Figure 16:
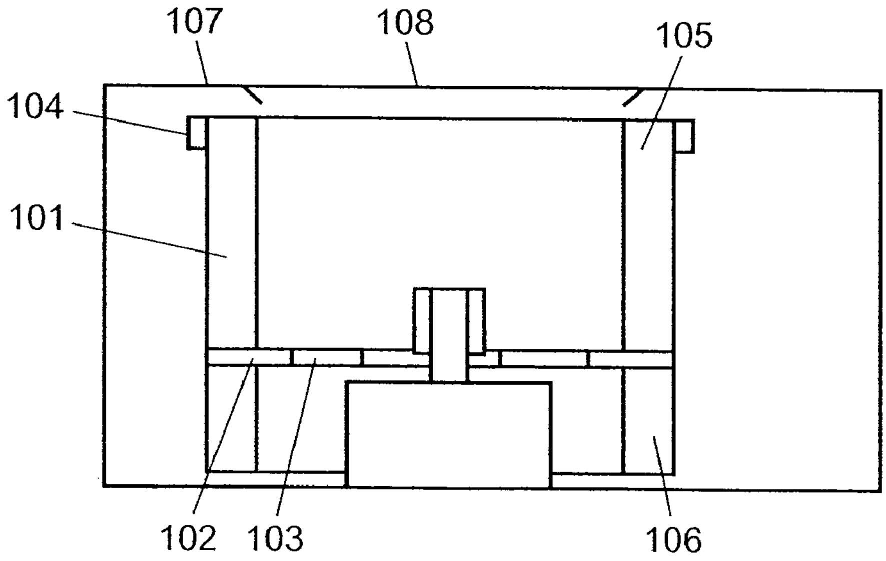
FIG. 16 PRIOR ART
FIG. 16 is a schematic view showing a side surface of a conventional multi-blade fan.
Figure 17:
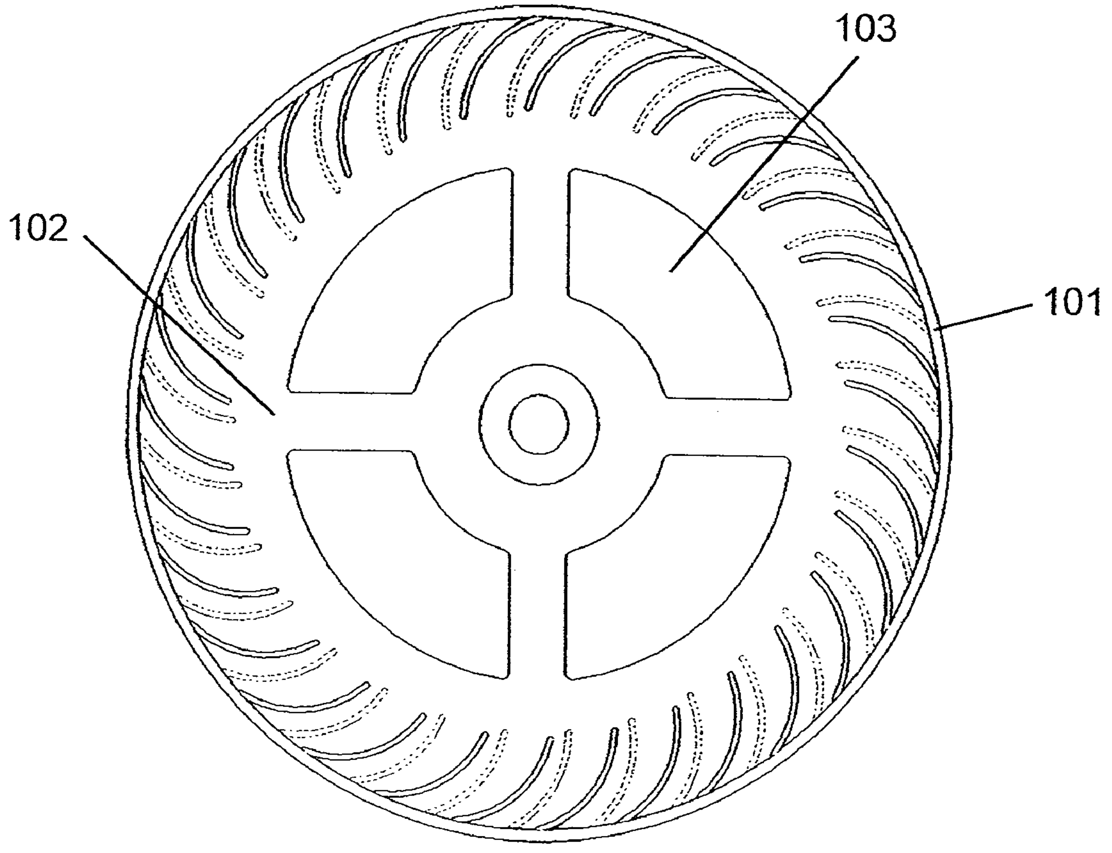
FIG. 17 PRIOR ART
FIG. 17 is a front view showing the conventional multi-blade fan.

FIG. 14 is a detailed view showing a blade of a multi-blade fan in accordance with a fifth exemplary embodiment of the present invention. FIG. 15 is a front view showing the multi-blade fan thereof. For easy description, FIG. 15 shows a sectional surface of only a part in which the outlet angle is an average outlet angle $\beta\mathbf{0}$. The same reference numerals are given to the same components as in the first to fourth exemplary embodiments and the detailed description thereof is omitted.

As shown in FIGS. 14 and 15, first blade 8 and second blade 9 use materials that can be easily deformed in a part extending from the diameter of main plate 7 on the outer shape side. Thus, as the number of rotation is increased, first blades 8 and second blades 9 are bent by the centrifugal force or the wind pressure, and the outlet angles thereof are reduced. The other configurations are the same as those of the first exemplary embodiment.

In multi-blade fan 1, in general, a load is increased at a low pressure of high air volume, and a load is reduced at a high pressure of low air volume. As a result, at the same voltage and by the same electric motor, the number of rotation is reduced at a low pressure of high air volume, and the number of rotation is increased at a high pressure of low air volume. Herein, the driving voltage of the electric motor is a usual commercial voltage, for example, 100V or 200V.

In the above-mentioned configuration, when first blades 8 and second blades 9 are rotated in the rotation direction R by electric motor 5, firstly, the number of rotation is small at a low pressure of high air volume. However, when a pressure starts to be applied to multi-blade fan 1, the number of rotation is increased. At this time, first blades 8 and second blades 9 are bent by a centrifugal force or a wind pressure. First blades 8 and second blades 9 move to positions 8*a* and 9*a* shown by a broken line, respectively. Thus, outlet angle $\beta\mathbf{0}$ of first blade 8 and outlet angle $\beta\mathbf{4}$ of second blade 9 become smaller like an average outlet angle $\beta\mathbf{0}a$ and outlet angle $\beta\mathbf{4}a$ shown by a broken line. When the outlet angle is reduced, a load is reduced. Then, the number of rotation is more and more increased. Since the number of rotation is increased as the pressure is increased, the centrifugal force and the wind pressure are also increased. Thus, average outlet angle $\beta\mathbf{0}a$ of first blade 8 and outlet angle $\beta\mathbf{4}a$ of second blade 9 are more and more reduced, a load is more and more reduced, and thus, the number of rotation is more increased. For a material of the blade, any materials can be used as long as they maintain the strength and they can be deformed so that the outlet angle is reduced due to a centrifugal force and a wind pressure. A suitable example of such a material includes a metal such as thin aluminum having a thickness of about 0.3 mm, resin such as polypropylene having a thickness of about 0.3 mm, or the like.

As a result, the difference in the number of rotation at the same voltage and by the same electric motor between a low pressure time and a high pressure time is more and more increased. Thus, it becomes easy to control an air volume to be constant.

Note here that only one of first blades 8 and second blades 9 are configured so that they are bent due to the centrifugal force or the wind pressure as the rotation number is increased, and an outlet angle is reduced. With such a configuration, although the effect is reduced, the difference in the number of rotation driven at the same voltage and by the same electric motor between at a low pressure time and at a high pressure time is increased, which facilitates controlling an air volume to be constant.

INDUSTRIAL APPLICABILITY

The present invention relates to a multi-blade fan mainly installed on the ceiling and used as a ventilation blower, which is useful when controlling an air volume to be constant is demanded to be facilitated.

The invention claimed is:

1. A multi-blade fan comprising:

a spirally-shaped casing including a bellmouth-shaped inlet and an outlet at one side;

an electric motor disposed inside the casing;

a main plate provided perpendicular to a rotation axis of the electric motor and having a ventilation hole;

first blades disposed at a side of the inlet of the main plate; and second blades disposed at an opposite side of the inlet of the main plate;

wherein a diameter of the main plate is smaller than an outer diameter of the first blades and an outer diameter of the second blades and the diameter of the main plate is larger than an inner diameter of the first blades and an inner diameter of the second blades, and an outlet angle of at least one of the first blades is changed sequentially in an axis direction such that the outlet angle of the one of the first blades at an inlet side of the one of the first blades is smaller than an outlet angle of the second blades and the outlet angle of the one of the first blades at a main plate side of the one of the first blades is larger than the outlet angle of the second blades.

2. The multi-blade fan of claim 1, wherein a ring-shaped lateral plate is disposed at an outer periphery of at least one of the first blades and the second blades.

3. The multi-blade fan of claim 1, wherein an outlet angle of at least one of the second blades is constant in the axis direction.

4. The multi-blade fan of claim 1, wherein an outlet angle of at least one of the first blades is increased sequentially in the axis direction toward the main plate.

5. The multi-blade fan of claim 1, wherein an inlet angle of at least one of the first blades at a side of the main plate is larger than an inlet angle of the second blade.

6. The multi-blade fan of claim 1, wherein the number of the second blades is same as or smaller than the number of the first blades.

7. The multi-blade fan of claim 1, wherein an inner diameter of at least one of the second blades is same as or smaller than an inner diameter of the first blade.

8. The multi-blade fan of claim 1, wherein the outlet angle of at least one of the first blade and the second blade is reduced due to a centrifugal force or a wind pressure as a rotation speed is increased.

* * * * *

UNITED STATES PATENT AND TRADEMARK OFFICE

CERTIFICATE OF CORRECTION

PATENT NO. : 8,221,069 B2
APPLICATION NO. : 12/096656
DATED : July 17, 2012
INVENTOR(S) : Kazuo Ogino et al.

It is certified that error appears in the above-identified patent and that said Letters Patent is hereby corrected as shown below:

Title page 2, FIELD [56], References Cited, FOREIGN PATENT DOCUMENTS, please delete the following duplicate references:

| | |
|---|---|
| "JP 2001115997 | 4/2001 |
| JP 2001271791A | 10/2001" |

Signed and Sealed this
Twenty-seventh Day of November, 2012

David J. Kappos
*Director of the United States Patent and Trademark Office*